(12) United States Patent
Guo et al.

(10) Patent No.: US 11,953,784 B2
(45) Date of Patent: Apr. 9, 2024

(54) LIGHT GUIDE PLATE ASSEMBLY, BACKLIGHT MODULE, AND DISPLAY DEVICE

(71) Applicant: Shanghai Tianma Micro-Electronics Co., Ltd., Shanghai (CN)

(72) Inventors: Zhanxiang Guo, Shanghai (CN); Yumin Xu, Shanghai (CN); Jianguo Bian, Shanghai (CN); Jiantao Ren, Shanghai (CN); Binbin Chang, Shanghai (CN); Zhaoxing Gao, Shanghai (CN); Weiyang Sun, Shanghai (CN); Wanzhen Wang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/306,448

(22) Filed: Apr. 25, 2023

(65) Prior Publication Data
US 2023/0258979 A1  Aug. 17, 2023

(30) Foreign Application Priority Data
Feb. 10, 2023 (CN) .......................... 202310099783.2

(51) Int. Cl.
*G02F 1/13357* (2006.01)
*F21V 8/00* (2006.01)

(52) U.S. Cl.
CPC ...... *G02F 1/133611* (2013.01); *G02B 6/0021* (2013.01); *G02B 6/0031* (2013.01); *G02B 6/0041* (2013.01); *G02B 6/0055* (2013.01); *G02B 6/0058* (2013.01); *G02B 6/0078* (2013.01); *G02B 6/0091* (2013.01); *G02F 1/133605* (2013.01); *G02F 1/133606* (2013.01)

(58) Field of Classification Search
CPC .. G02B 6/0021; G02B 6/0031; G02B 6/0055; G02B 6/0078; G02F 1/133605; G02F 1/133606
See application file for complete search history.

(56) References Cited

U.S. PATENT DOCUMENTS

| | | | |
|---|---|---|---|
| 2015/0124484 A1* | 5/2015 | Gu | G02F 1/1336 362/613 |
| 2020/0064687 A1* | 2/2020 | Imada | G02F 1/133504 |
| 2021/0247053 A1* | 8/2021 | Nakabayashi | F21V 14/06 |

FOREIGN PATENT DOCUMENTS

CN  110703497 A  1/2020

* cited by examiner

*Primary Examiner* — Keith G. Delahoussaye
(74) *Attorney, Agent, or Firm* — CHRISTENSEN O'CONNOR JOHNSON KINDNESS PLLC

(57) ABSTRACT

A light guide plate assembly, a backlight module, and a display device are provided. The light guide plate assembly is configured to guide exiting light emitted from a light-emitting element. The light guide plate assembly includes a reflective part includes an opening, and a transmissive part. At least a part of the transmissive part is located at a side of the reflective part adjacent to a light-exiting side of the light guide plate assembly. The transmissive part includes a first part. Along a direction from a center of the opening to an edge of the opening, light intensity of the exiting light received by the first part is negatively correlated to light transmittance of the first part.

20 Claims, 7 Drawing Sheets

LIGHT GUIDE PLATE ASSEMBLY, BACKLIGHT MODULE, AND DISPLAY DEVICE

CROSS-REFERENCE TO RELATED APPLICATIONS

The present application claims priority to Chinese Patent Application No. 202310099783.2, filed on Feb. 10, 2023, the content of which is incorporated herein by reference in its entirety.

TECHNICAL FIELD

The present disclosure relates to the field of display technology, in particular to a light guide plate assembly, a backlight module, and a display device.

BACKGROUND

With the development of display technology, flat display devices, such as liquid crystal display (LCD), are widely used in various electronic products, such as telephone, television, digital camera, and laptop, due to its advantages, such as high quality, power saving and wide application range. Consequently, flat display devices have become a mainstream product in the display devices.

The LCD display panel itself does not emit light, but is used with a backlight module. Exiting light of current backlight modules is of uneven brightness at different positions.

SUMMARY

In one aspect of the present disclosure, a light guide plate assembly is provided. In an embodiment, the light guide plate assembly is configured to guide exiting light emitted from a light-emitting element and includes a reflective part and a transmissive part. The reflective part has an opening. At least a portion of the transmissive part is located at a side of the reflective part adjacent to a light-exiting side of the light guide plate assembly. The transmissive part includes a first part, and at least a portion of the first part is located in the opening of the reflective part. Along a direction from a center of the opening to an edge of the opening, light intensity of the exiting light received by the first part is negatively correlated to light transmittance of the first part.

In another aspect of the present disclosure, a backlight module is provided. In an embodiment, the backlight module includes a light-emitting element and the light guide plate assembly provided in the first aspect. The light guide plate assembly is located at a light-exiting side of the light-emitting element, and the light-emitting element corresponds to the center of the opening.

In yet another aspect of the present disclosure, a display device is provided. In an embodiment, the display device includes a display panel and the backlight module provided in the second aspect.

DRIVING TRANSISTOR BRIEF DESCRIPTION OF DRAWINGS

In order to more clearly explain the embodiments of the present disclosure, the drawings used in the description of the embodiments or the related art will be briefly described below. The drawings in the following description are some embodiments of the present disclosure. Those skilled in the art can obtain other drawings based on these drawings.

DESCRIPTION OF EMBODIMENTS

In order to better understand the technical solutions of the present disclosure, embodiments of the present disclosure will be described in detail below with reference to the accompanying drawings.

It should be clear that the described embodiments are only some of the embodiments of the present disclosure, rather than all of the embodiments. Based on the embodiments of the present disclosure, all other embodiments obtained by those of ordinary skill in the art shall fall within the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there can be three relations, e.g., A and/or B can indicate A alone, both A and B, and B alone. In addition, the symbol "/" in the context generally indicates that the relation between the objects in front and at the back of "/" is an "or" relationship.

It should be understood that although "first", "second", or the like can be used to describe transmissive parts in embodiments of the present disclosure, the transmissive parts are not limited to these terms. These terms are only used to distinguish the transmissive parts from each other. For example, without departing from the scope of the embodiments of the present disclosure, the first part can also be referred to as the second part. Similarly, the second part can also be referred to as the first part.

Figure 1:
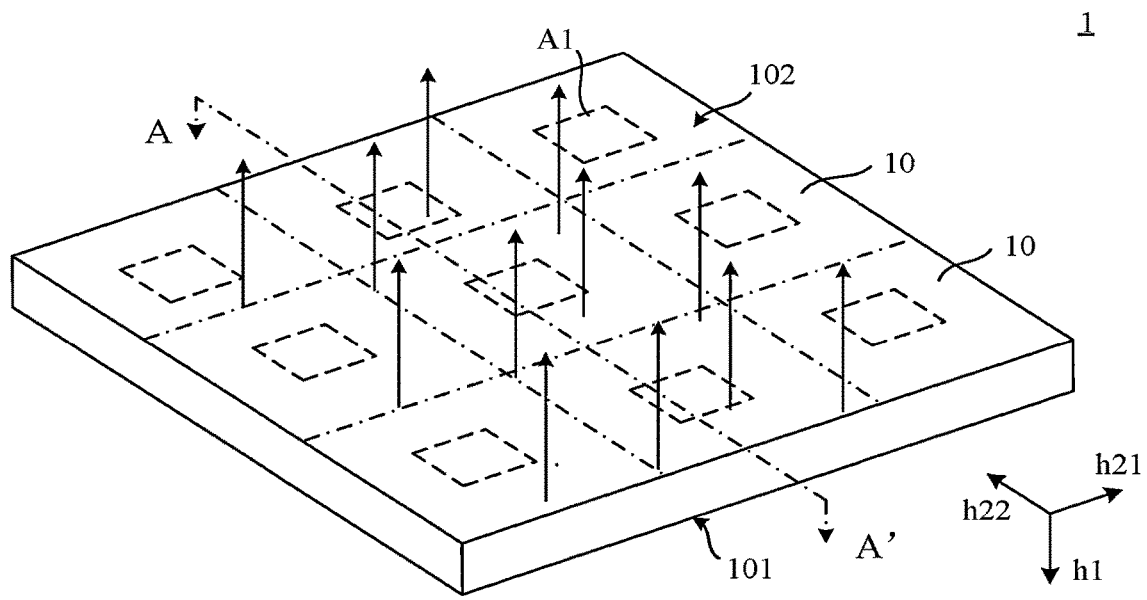
FIG. 1 is a perspective view of a light guide plate assembly provided by some embodiments of the present disclosure.

Examples of the present disclosure provide a light guide plate assembly. FIG. 1 is a perspective view of a light guide plate assembly provided by some embodiments of the present disclosure. As shown in FIG. 1, the light guide plate assembly 1 has a light-entering side 101 and a light-exiting side 102 that are opposite to each other along a thickness direction h1 of the light guide plate assembly 1. The light guide plate assembly 1 is configured to guide light emitted from the light-emitting element. The light emitted from the light-emitting element is incident on the light-entering side 101 of the light guide plate assembly 1, and then exits the light guide plate assembly 1 through the light-exiting side 102. The arrow passing through the light guide plate assembly 1 in FIG. 1 illustrates a propagating direction of light passing through the light guide plate assembly 1. When the light guide plate assembly 1 and the light-emitting element are assembled form a backlight module, the light-emitting element is adjacent to the light-entering side 101 of the light guide plate assembly 1.

Figure 2:
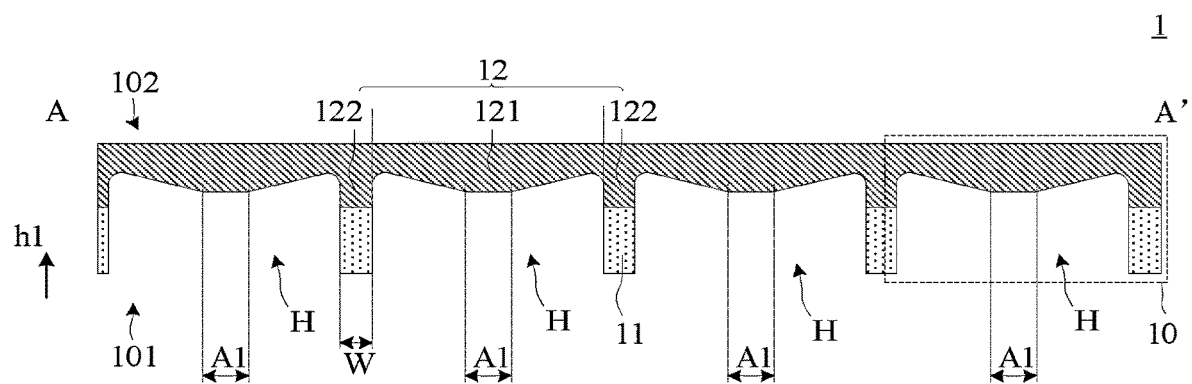
FIG. 2 is a cross-sectional view taken alone line AA' shown in FIG. 1 according to an embodiment of the present disclosure.

FIG. 2 is a cross-sectional taken view alone line AA' shown in FIG. 1. As shown in FIG. 1 and FIG. 2, the light guide plate assembly 1 includes multiple light guide plate units 10. The multiple light guide plate units 10 are arranged in directions parallel to a plane the light guide plate assembly 1. As shown in FIG. 1, the multiple light guide plate units 10 are arranged in rows and columns. As shown in FIG. 1, the first direction H21 and the second direction H22 cross each other to define the plane of the light guide plate assembly 1.

Figure 3:
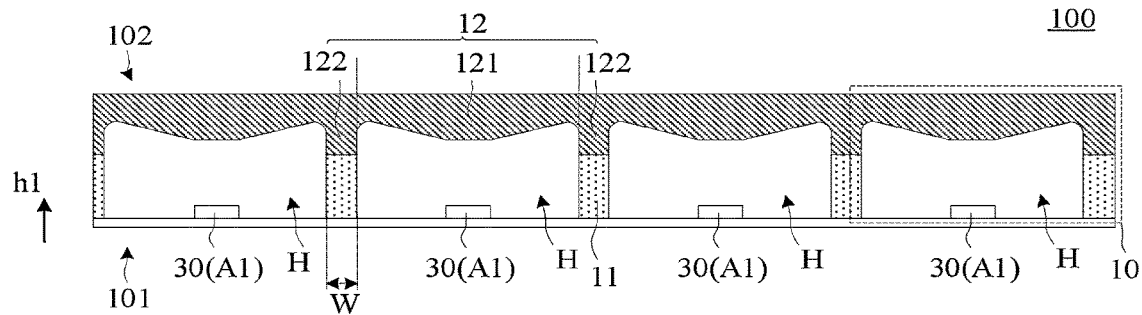
FIG. 3 is a cross-sectional view of a backlight module provided by some embodiments of the present disclosure.

As shown in FIG. 1 and FIG. 2, the light guide plate unit 10 has a light-emitting element setting region A1 configured to arrange the light-emitting element. For example, when the light guide plate assembly 1 and the light source are assembled to form the backlight module, the light-emitting elements in the light source and the light guide plate units 10 are in one-to-one correspondence. FIG. 3 is a cross-sectional view of a backlight module 100 provided by some embodiments of the present disclosure. As shown in FIG. 3, the light-emitting element 30 is located in the light-emitting element setting region A1.

As shown in FIG. 2 and FIG. 3, the light guide plate unit 10 further includes a reflective part 11 and a transmissive part 12. The reflective part 11 is configured to reflect light emitted by the light-emitting element (not shown in FIG. 2). The transmissive part 12 is configured to transmit the light emitted by the light-emitting element (not shown in FIG. 2). A reflectivity of the reflective part 11 is greater than a reflectivity of the transmissive part 12. A transmissivity of the transmissive part 12 is greater than a transmissivity of the reflective part 11.

In some embodiments of the present disclosure, as shown in FIG. 2 and FIG. 3, the reflective part 11 has an opening H. At least a portion of the transmissive part 12 is located at a side of the reflective part 11 adjacent to the light-exiting side of the light guide plate assembly 1. The light-emitting element setting area A1 is located in the opening H. As shown in FIG. 3, when the light guide plate assembly 1 is applied in the backlight module 100, the light-emitting element 30 in the backlight module 100 can be set in the opening H. The light-emitting element setting area A1 can correspond to a center of the opening H. That means, an orthographic projection of the light-emitting element 30 on the plane of the light guide plate assembly 1 overlaps the center of the opening H.

As shown in FIG. 2 and FIG. 3, the transmissive part 12 includes a first part 121, and at least a portion of the first part 121 is located in the opening H. Along a direction from a center of the opening H to an edge of the opening H, light intensity of the exiting light received by the first part 121 is negatively correlated to light transmittance of the first part. The exiting light is emitted by the light-emitting element 30 corresponding to the opening H. That means, for a plurality of portions of the first part along a direction from a center of the opening to an edge of the opening, light intensity of the exiting light received by the portion is negatively correlated to light transmittance of the portion.

The light guide plate assembly 1 provided by the embodiments of the present disclosure 1 includes the transmissive part 12 and the reflective part 11, and the reflective part 11 is provided with the opening H. The light-emitting element 30 is provided in the opening H to form a bottom-lighting type backlight module, which can reduce the thickness of the backlight module.

Figure 4:
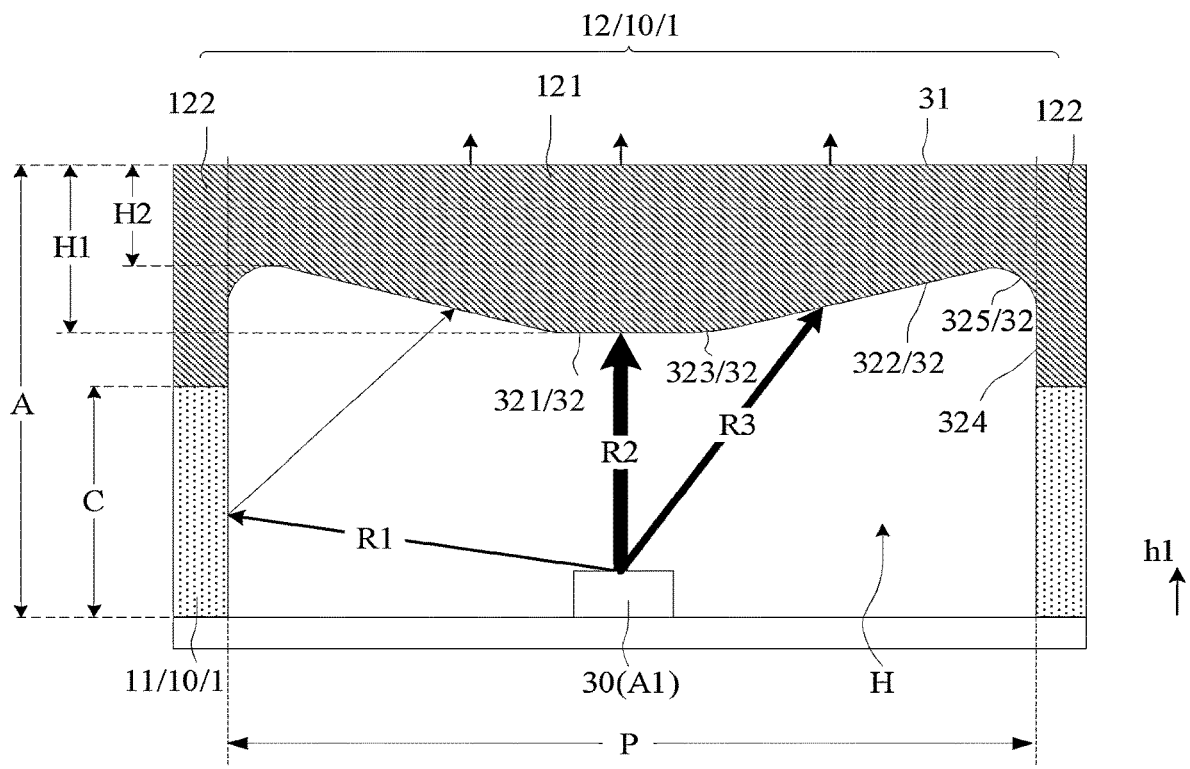
FIG. 4 is a schematic diagram of an optical path of exiting light emitted from a light-emitting element in a light guide plate unit provided by some embodiments of the present disclosure.

With the above configuration, a surface of the reflective part 11 adjacent to the opening H can be used to reflect large-angled light emitted by the light-emitting element 30. The large-angled light refers to light, emitted by the light-emitting element 30, forming a relatively large angle with a thickness direction of the light guide plate assembly 1. FIG. 4 is a schematic diagram of an optical path, in a light guide plate unit, of exiting light emitted from a light-emitting element provided by some embodiments of the present disclosure. As shown in FIG. 4, for first exiting light R1 emitted from the light-emitting element 30, a relatively large angle is formed between the first exiting light R1 and the thickness direction of the light guide plate assembly 1, the surface of the reflective part 11 adjacent to the opening H can reflect the first exiting light R1, and the reflected light exists through the transmissive part 12. It can be seen that the reflective part 11 avoids interference between light emitted from different light-emitting elements 30.

The transmissive part 12 provided by the embodiment of the present disclosure includes the first part 121, and along the direction from the center of the opening to the edge of the opening, light intensity of the exiting light received by the first part 121 is negatively correlated to light transmittance of the first part 121. As shown in FIG. 4, for second exiting light R2 and third exiting light R3 that are incident on the first part 121 at different positions, the light intensity of the second exiting light R2 is greater than the light intensity of the third exiting light R3 (the light intensity difference between the second exiting light R2 and the third exiting light R3 is distinguished by straight lines with different widths in FIG. 4). In the embodiments of the present disclosure, the light transmittance of the first part 121 at a position where the second exiting light R2 is incident on is smaller than the light transmittance of the first part 121 at a position where the third exiting light R3 is incident on. Therefore, after the second exiting light R2 and the third exiting light R3 pass through the first part 121, the difference between the light intensity of the second exiting light R2 and the light intensity of the third exiting light R3 decreases. With the above configuration, light emitted from the light-emitting element 30 and passing through different positions of the first part 121 tends to be consistent in light intensity. In this way, uneven light intensity of the light exiting the light guide plate assembly 1 caused by uneven light intensity of the light emitted by the light-emitting element 30 with different emitting angles can be avoided, for example, a visible grid pattern of the backlight module including the light guide plate assembly 1 is avoided, which improves the optical uniform of the backlight module including the light guide plate assembly 1.

For example, when designing the light guide plate assembly, the light transmittance at different positions of the first part 121 is designed according to the light distribution curve of the light-emitting element 30.

Figure 5:
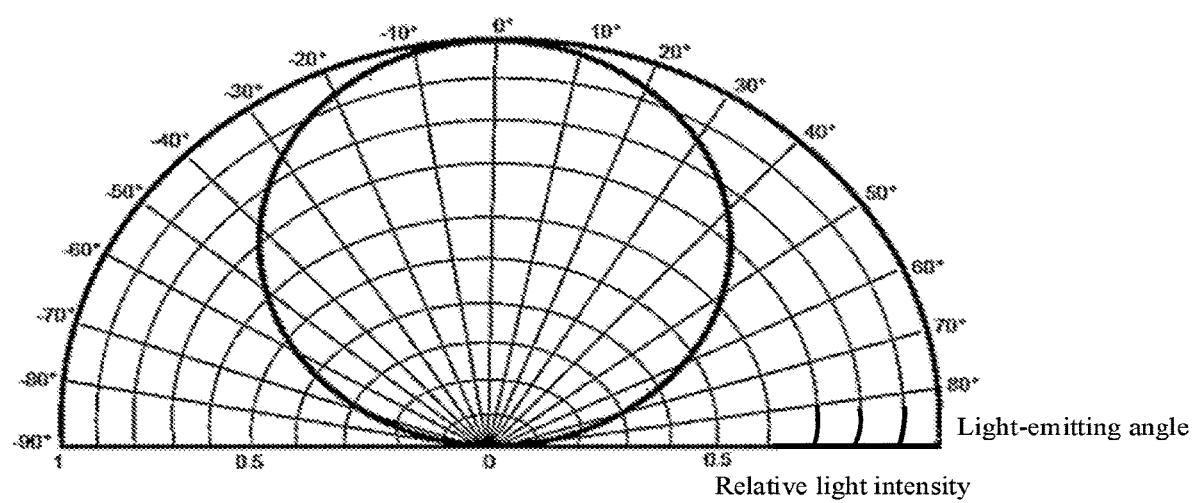
FIG. 5 is a graph of a light distribution curve of a light-emitting element provided by some embodiments of the present disclosure.

FIG. 5 is a graph of a light distribution curve of a light-emitting element provided by some embodiments of the present disclosure. For example, the light-emitting element 30 has a light distribution curve as shown in FIG. 5. That is, as a light-emitting angle of the exiting light emitted from the light-emitting element becomes larger, the light intensity gradually decreases. The light-emitting angle refers to an angle formed between a propagating direction of the exiting light and a direction perpendicular to a light-emitting surface of the light-emitting element. When setting the light-emitting element 30 at the center of the opening H, the greater the angle between the propagation direction of the exiting light emitted from the light-emitting element 30 and the direction perpendicular to the light guide plate assembly 1, the greater a horizontal distance between the center of the opening H and the position (incident position) of the first part 121 receiving the exiting light emitted from the light-emitting element 30. That is, for the positions of the first part 121 along the direction from the center of the opening H to the edge of the opening H, the light intensity of the exiting light, emitted by the light-emitting element 30 and received by the positions of the first part 121, gradually decreases, and correspondingly, the light transmittance of the positions of the first part 121 increases, so that the light intensity of light emitted from the light-emitting element 30 and then exiting from different positions of the first part 121 tends to be the same.

Figure 6:
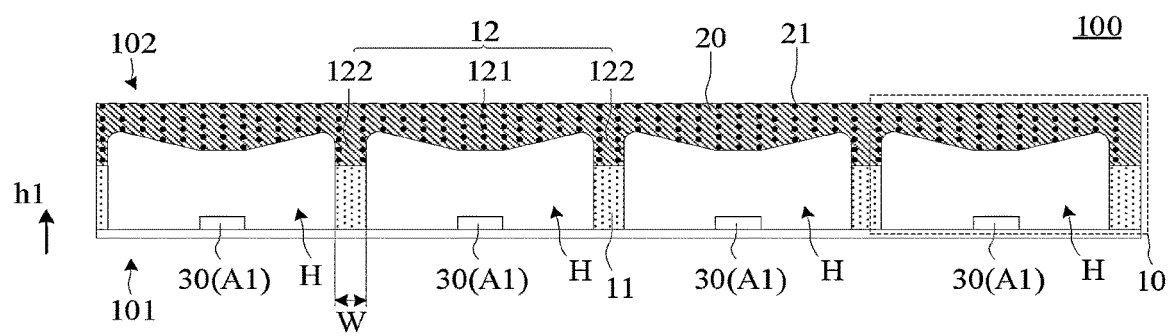
FIG. 6 is another cross-sectional view of a light guide plate assembly provided by some embodiments of the present disclosure.
Figure 7:
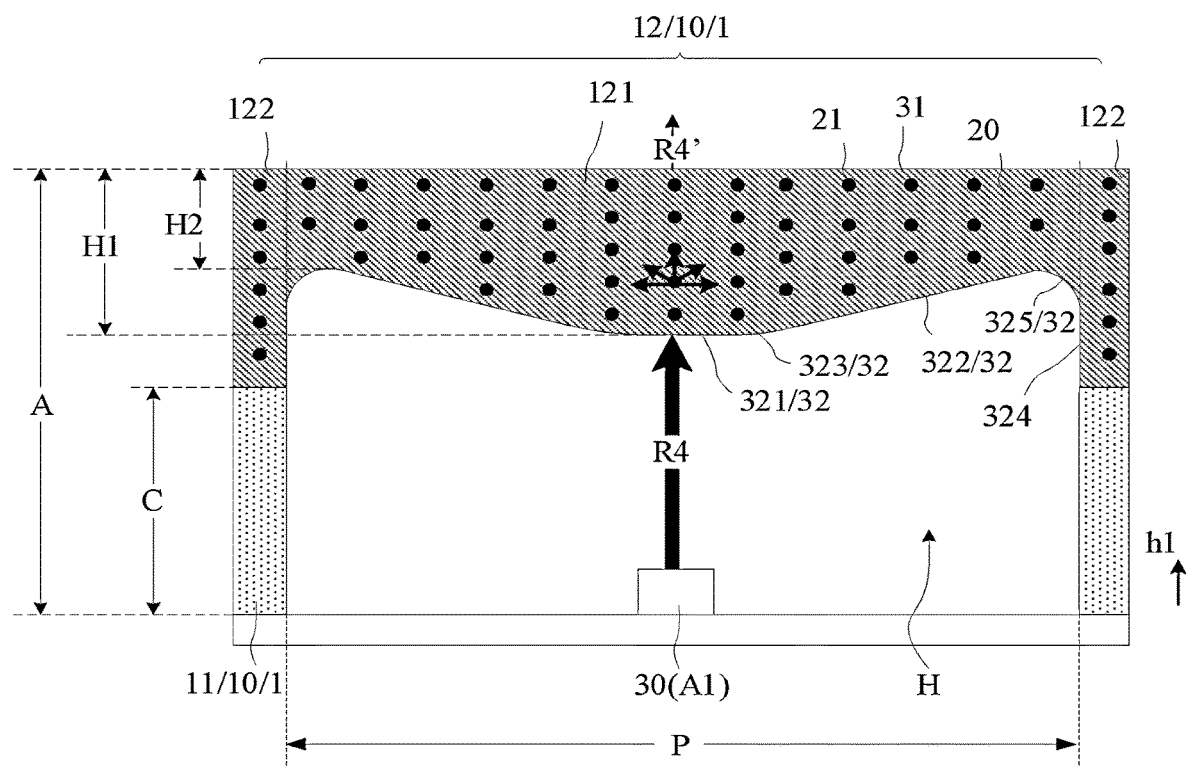
FIG. 7 is another schematic diagram of an optical path of exiting light emitted from a light-emitting element in a light guide plate unit provided by some embodiments of the present disclosure.

FIG. 6 is another cross-sectional view of a light guide plate assembly provided by some embodiments of the present disclosure. Exemplarily, as shown in FIG. 6, the transmissive part 12 includes a body 20 and diffusion particles 21 dispersed in the body. In some embodiments of the disclosure, the diffusion particle 21 and the body 20 have different refractive indices. The exiting light emitted from the light-emitting element 30 passes through the body 20 and the diffusion particles 21 with different refractive indices as it passes through the first part 121. At least one of refraction, reflection or scattering occurs when the exiting light emitted from the light-emitting element 30 is incident to the diffusion particles 21 via the body 20. FIG. 7 is another schematic diagram of an optical path of exiting light emitted from a light-emitting element in a light guide plate unit provided by some embodiments of the present disclosure. In combination with FIG. 7, an angle formed between the fourth exiting light R4 of the light-emitting element 30 and a thickness direction h1 of the light guide plate assembly 1 is 0, that is, the fourth exiting light R4 passes through the center of the opening H and then passes through the diffusion particles 21, and then is scattered to generate different sub-light with different propagating directions, the light intensity of the sub-light is smaller than the light intensity of the fourth exiting light R4, and at least part of the sub-light has a propagating direction deviating from the propagating direction before being incident to the particles. In this way, the exiting light R4' formed after the fourth exiting light R4 passing through the first part 121 has a light intensity smaller than the light intensity of the fourth exiting light R4. That is, the diffusion particle 21 can reduce the light transmittance of the transmissive part 12 at the position where the diffusion particle 21 is provided. In the embodiments of the present disclosure, at least some of the diffusion particles 21 correspond to the center of the opening H along the thickness direction h1 of the light guide plate assembly 1. That is, an orthographic projection of at least some of the diffusion particles 21 on the plane of the light guide plate assembly 1 overlaps with the center of the opening H, which can at least partially reduce the light transmittance of the first part 121 at a position corresponding to the center of the opening H.

In some embodiments, as shown in FIG. 6 and FIG. 7, the above diffusion particles 21 are uniformly distributed in the body 20, that is, the first part 121 has a same concentration of diffusion particles 21 at any positions. The concentration of diffusion particles 21 is the number of diffusion particles 21 in the first part 121 per unit volume.

When preparing the first part 121, exemplarily, the body 20 blended with the diffusion particles 21 are molded to form the first part 121. In some embodiments, the molding process includes injection molding. The embodiments of the present disclosure can reduce the difficulty of the preparation process of the first part 121 by making the diffusion particles 21 uniformly dispersed at different positions of the body 20.

Exemplarily, as shown in FIG. 6 and FIG. 7, the thickness of the body 20 gradually decreases along the direction from the center of the opening H to the edge of the opening H. When the diffusion particles 21 are uniformly dispersed in the body 20, the thickness of the body 20 gradually decreases along the direction from the center of the opening H to the edge of the opening H, for example, the number of diffusion particles 21 in the body 20 can be gradually reduced along the direction from the center of the opening H to the edge of the opening H. In this way, the light transmittance of the first part 121 can gradually become larger to match the light distribution curve of the light-emitting element 30, achieving uniform light exiting of the backlight module where the light guide plate assembly 1 is included.

When designing the light guide plate assembly 1, exemplarily, the desired light transmittance at different positions of the first part 121 can be obtained according to the light distribution curve of the light-emitting element 30 provided in the light guide plate assembly 1, and then the thickness of the body 20 can be designed according to the light transmittance at various positions of the first part 121.

In some embodiments, the light transmittance Y of the first part 121 and the thickness X of the body 20 satisfy: $Y = -0.0143X^3 + 0.1157X^2 - 0.377X + 0.9157$ (1).

When designing the light guide plate assembly 1, after the light transmittance of the first part 121 at a position is determined, the thickness of the body 20 in the first part 121 at this position can be designed according to the above formula (1), where the thickness is in millimeters.

In some embodiments, a light diffusion degree D of the first part 121 satisfies: $D \geq 50$, where the light diffusion degree refers to an angle formed between incident light and reflected light, where the light intensity of the incident light is half of light intensity of the incident light passing through the first part 121. Such configuration can ensure that the light intensity of light emitted from different positions of the first part 121 is uniform, which is conducive to improving the uniformity of the light exiting from the first part 121.

Exemplarily, in some embodiments of the present disclosure, a melting index M of the body 20 satisfies: M≥30 cm³/10 min, so that the body 20 has a good flow processability to facilitating processing and molding of the first part 121, as well as to improve the quality of the molded first part 121.

Exemplarily, in some embodiments of the present disclosure, a density N of the first part 121 satisfies: 1.0 g/cm³≤N≤1.4 g/cm³. For example, in some embodiments of the present disclosure, N=1.2 g/cm³. Such configuration facilitates the lightweight design of the first part 121.

Exemplarily, the body 20 includes any one of polyethylene terephthalate (PET), polymethyl methacrylate (PMMA), polycarbonate (PC), and polystyrene (PS).

Exemplarily, the diffusion particles 21 include at least one of acrylic acid, organosilicone, polyethylene, barium sulfate nanoparticles, silicon dioxide, or calcium carbonate.

Exemplarily, as shown in FIG. 2, FIG. 3, and FIG. 4, in some embodiments of the present disclosure, no diffusion particles are provided in the first part 121. In some embodiments, as shown in FIG. 2, FIG. 3, and FIG. 4, the thickness of the first part 121 gradually decreases along the direction from the center of the opening H to the edge of the opening H to achieve that the light transmittance of the first part 121 decreases along the direction from the center of the opening H to the edge of the opening H. Exemplarily, the body 20 includes any one of PET, PMMA, PC, and PS.

Exemplarily, as shown in FIG. 4 and FIG. 7, the transmissive part 12 includes a first surface 31 located at a side of the transmissive part 12 adjacent to the light-exiting side of the light guide plate assembly 1. That is, the first surface 31 is a light-exiting surface of the transmissive part 12. The first surface 31 is parallel to the plane of the light guide plate assembly 1. Such configuration, on the one hand, is conducive to improving the uniformity of the light emitting of the light guide plate assembly 1, and on the other hand, can also facilitate the subsequent attachment of the light guide plate assembly 1 with other structures.

Exemplarily, as shown in FIG. 4 and FIG. 7, the transmissive part 12 includes a second surface 32 located at a side of the transmissive part 12 adjacent to the light-entering side of the light guide plate assembly 1. That is, the second surface 32 is a light-entering surface of the transmissive part 12.

Exemplarily, as shown in FIG. 4 and FIG. 7, the second surface 32 includes a first sub-surface 321 corresponding to the center of the opening H in the thickness direction of the light guide plate assembly 1. That is, an orthographic projection of the first sub-surface 321 on the plane of the light guide plate assembly 1 overlaps with the center of the opening H. In the embodiments of the disclosure, the first sub-surface 321 is parallel to the plane of the light guide plate assembly 1. The exiting light emitted from the light-emitting element 30 with a relatively small light-emitting angle is incident to the first sub-surface 321. The thickness of the first part 121 is relatively large at the position corresponding to the center of the opening H. By providing the first sub-surface 321 parallel to the plane of the light guide plate assembly 1 and corresponding to the opening H, the area of the region in the first part 121 with the relatively large thickness can be increased, so that the light guide plate assembly 1 matches the light-emitting element 30 with a plan light source design. For example, in some embodiments of the present disclosure, a light-emitting surface of the light-emitting element 30 corresponds to the first sub-surface 321. Exemplarily, the light-emitting surface of the light-emitting element 30 is parallel to the first sub-surface 321 and the first surface 31.

Exemplarily, as shown in FIG. 4 and FIG. 7, the second surface 32 further includes a second sub-surface 322, and the second sub-surface 322 and the center of the opening H are staggered from each other along the thickness direction of the light guide plate assembly 1. The second sub-surface 322 and the center of the opening H do not overlap in the plan view. The exiting-light emitted from the light-emitting element 30 with a large light-emitting angle is incident to the second sub-surface 322. Exemplarily, the second sub-surface 322 at least corresponds to the edge of the opening H along the thickness direction hl, that is, an orthographic projection of the second sub-surface 322 on the plane of the light guide plate assembly 1 overlaps with the edge of the opening H. The light transmittance of first part 121 at the second sub-surface 322 is greater than the light transmittance of first part 121 at the first sub-surface 321.

Exemplarily, as shown in FIG. 4 and FIG. 7, the second surface 32 further includes a third sub-surface 323 that connects the first sub-surface 321 and the second sub-surface 322. Exemplarily, as shown in FIG. 4 and FIG. 7, the third sub-surface 323 and the center of the opening H are staggered from each other along the thickness direction hl of the light guide plate assembly 1. The third sub-surface 323 includes a curved surface. With such configuration, the second surface 32 is smoothly transited from the first sub-surface 321 to the second sub-surface 322 that is located in a different plane from the first sub-surface 321, which avoids forming a sharp angle between the first sub-surface 321 and the second sub-surface 322, and thus is conducive to improving the visual uniformity of the second surface 32. Exemplarily, the light transmittance of the first part 121 at the third sub-surface 323 is greater than or equal to the light transmittance of the first part 121 at the first sub-surface 321, and the light transmittance of the first part 121 at the third sub-surface 323 is smaller than or equal to the light transmittance of the first part 121 at the second sub-surface 322.

Exemplarily, as shown in FIG. 2, FIG. 3, FIG. 4, FIG. 6, and FIG. 7, the transmissive part 12 further includes a second part 122 located at a side of the reflective part 11 adjacent to the light-exiting side of the light guide plate assembly 1. The second part 122 at least partially surrounds the first part 121. The second part 122 and the opening H are staggered from each other in the direction perpendicular to the plane in of the light guide plate assembly 1 (the thickness direction of the light guide plate assembly 1). A thickness of the second part 122 is greater than or equal to a minimum thickness of the first part 121. The second part 122 can improve the light intensity of the exiting light at a corresponding position of the reflective part 11 and help to avoid dark strips at the reflective part 11. The uniformity of exiting light exiting the backlight module at different positions can be improved when the light guide assembly 1 and the light-emitting element 30 are assembled to form the backlight module.

Exemplarily, a thickness of the second part 12 can be greater than a thickness of an edge of the first part 121. With such configuration, the distance between the reflective part 11 and the light-exiting surface of the light guide plate assembly 1 can will not be too small, which helps to weaken or eliminate the problem of light spots appearing at the position corresponding to the reflective part 11.

Exemplarily, as shown in FIG. 4 and FIG. 7, the second part 122 includes a fourth sub-surface 324 adjacent to the opening H.

The second surface 32 further includes a fifth sub-surface 325, which connects the second sub-surface 322 and the fourth sub-surface 324, and the fifth sub-surface 325 includes a curved surface. With such configuration, the transiting from the second sub-surface 322 to the fourth sub-surface 324 located in a different plane from the second sub-surface 322 is smooth, which avoids forming a sharp angle between the second sub-surface 322 and the fourth sub-surface 324, and helps to improve the visual uniformity at a transition position between the second sub-surface 322 and the fourth sub-surface 324 that are located in different planes.

Exemplarily, the first part 121 and the second part 122 can be formed in one piece, that is, as shown in FIG. 2, FIG. 3, FIG. 4, FIG. 6, and FIG. 7, no interface exists between the first part 121 and the second part 122. With such configuration, the molding process efficiency of the first part 121 and the second part 122 can be improved, and the process cost can be reduced. Exemplarily, as shown in FIG. 6 and FIG. 7, when the first part 121 includes the body 20 and the diffusion particles 21, the second part 122 can also include a body 20 and diffusion particles 21. When the first part 121 includes the body 20 and the diffusion particles 21, the first surface 31, the first sub-surface 321, the second sub-surface 322, the third sub-surface 323, the fourth sub-surface 324, and the fifth sub-surface 325 are surfaces of the body 20 at the corresponding positions, respectively.

Exemplarily, as shown in FIG. 4 and FIG. 7, a thickness H1 of the first transmissive part 121 at a position corresponding to the center of the opening H, and a thickness H2 of the first part 121 at a position corresponding to the edge of the opening H satisfy: H1>H2, 1.4 mm≤H1≤1.8 mm, and 0.7 mm≤H2≤1.0 mm. While ensuring the light transmittance of the first part 121 at different positions, H1≤1.8 mm, and H2≤1.0 mm, which can reduce the thickness of the light guide plate assembly 1. H1≥1.4 mm, and H2≥0.7 mm are not only compatible with the available process capability to avoid increasing the process difficulty of the first part 121, but also facilitates to increasing an adjusting scope of the light transmittance of the first part 121 at a position between a position corresponding to the center of the opening H and a position corresponding to the edge of the opening H. In this way, the first part 121 can be applied to light-emitting elements with different light distribution curves, that is, broadening the range of application of the first part 121.

Exemplary, as shown in FIG. 4 and FIG. 7, the thickness A of the light guide plate assembly 1 and a width P of the opening H satisfy: P/A≥2.8. With such configuration, the optical effect of the light guide plate assembly 1 is improved while ensuring enough space for accommodating the light-emitting element 30 by increasing the width of the opening H, so that the difficulty in assembling the light-emitting element 30 and light guide plate assembly 1 can be reduced. At the same time, the distance between two adjacent light-emitting elements 30 can also be increased, which can avoid interference between different light-emitting elements 30. On the other hand, the thickness of the light guide plate assembly 1 can be reduced to achieve a thin design of the light guide plate assembly 1.

In some embodiments, A≥2 mm, so the thickness of the reflective part 11 and the transmissive part 12 in the light guide plate assembly 1 will not be too small, which is compatible with the available process capability and does not increase the process difficulty of the light guide plate assembly 1.

Exemplarily, P≥5 mm.

In some embodiments, a width W of the reflective part 11 has a same value or gradually increases along the direction from the light-entering side of the light-guide plate assembly 1 to the light-exiting side of the light-guide plate assembly 1, and a width direction of the reflective part 11 is parallel to the plane of the light-guide plate assembly 1. When preparing the light guide plate assembly 1, the transmissive part 12 can be shaped first by molding, and then an injection molding material for forming the reflective part is injected into a mold including the transmissive part 12. De-molding can be easily achieved by setting the width of the reflective part 11 to have a same value or gradually increase in the direction from the light-entering side of the light-guide plate assembly 1 to the light-exiting side of the light-guide plate assembly 1. FIG. 2, FIG. 3, and FIG. 6 each show that the width W of the reflective part 11 at different positions have a same value.

Exemplarily, as shown in FIG. 4 and FIG. 7, the thickness A of the light guide assembly 1 and a thickness C of the reflective part 11 satisfy: 0.7 mm≤C≤2A/3. In the embodiments of the present disclosure, C≥0.7 mm, it avoids that the thickness of the reflective part 11 is too small and is compatible with the available process capability, reducing the process difficulty. In the embodiments of the present disclosure, C≤2A/3, it avoids that the distance between the reflective part 11 and the light-exiting surface of the light guide plate assembly 1 is too small, and avoids the light spot occurring at the position corresponding to the reflective part 11.

Figure 8:
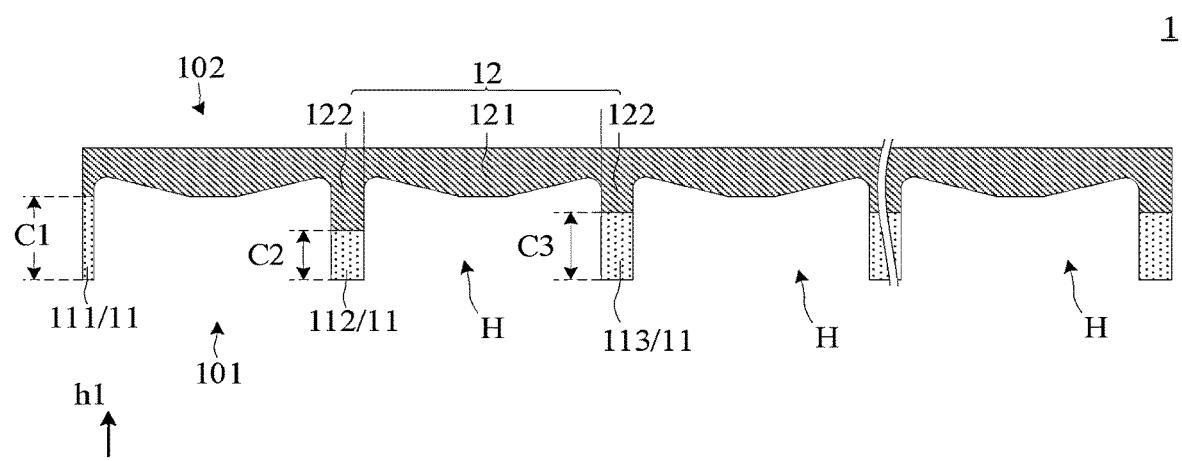
FIG. 8 is another cross-sectional view of a light guide plate assembly provided by some embodiments of the present disclosure.

FIG. 8 is another cross-sectional view of a light guide plate assembly provided by some embodiments of the present disclosure. Exemplarily, as shown in FIG. 8, the reflective parts 11 includes a first reflective part 111, a second reflective part 112, and a third reflective part 113. The first reflective part 111, the second reflective part 112, and the third reflective part 113 are parallel to the plane of the light guide plate assembly 1 and arranged from the edge of the light guide plate assembly 1 to a center of the light guide plate assembly 1. A thickness C1 of the first reflective part 111 is greater than or equal to a thickness C3 of the third reflective part 113, and the thickness C3 of the third reflective part 113 is greater than or equal to a thickness C2 of the second reflective part 112. In the related technology, light intensity of the light adjacent to the edge of the light guide plate assembly 1 is small. By setting the thickness C2 of the second reflective part 112 to be relatively small, the exiting light emitted from the light-emitting element 30 located at a side of the second reflective part 112 away from the edge of the light guide plate assembly 1 is diffused and then propagates towards a side adjacent to the edge of the light guide plate assembly 1, that is, the light intensity in the region between the first reflective part 111 and the second reflective part 112 can be enhanced, which is conducive to improving the uniformity of the light intensity of light emitted from different positions of the light guide plate assembly 1.

Figure 9:
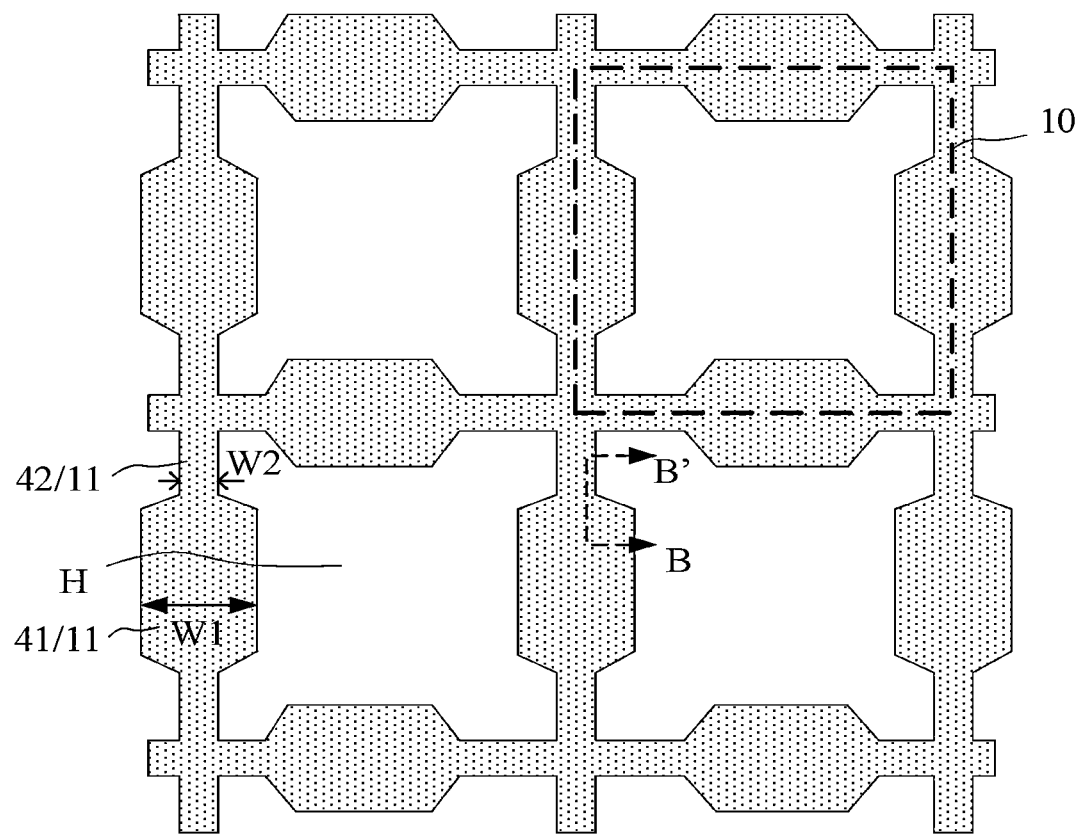
FIG. 9 is a top view of a reflective part provided by some embodiments of the present disclosure.
Figure 10:
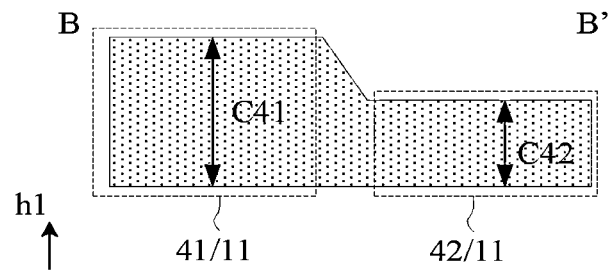
FIG. 10 is a cross-sectional view taken along line BB' shown in FIG. 9 according to an embodiment of the present disclosure.

FIG. 9 is a top view of a reflective part provided by some embodiments of the present disclosure. FIG. 10 is a cross-sectional view taken along line BB' shown in FIG. 9. Exemplarily, as shown in FIG. 9 and FIG. 10, the reflective part 11 includes a first part 41 and a second part 42 that are connected to each other, and a distance between the second part 42 and the center of the opening H is greater than a distance between the first part 41 and the center of the same opening H. As shown in FIG. 9, a width W1 of the first part 41 is greater than or equal to a width W2 of the second part 42, and/or, as shown in FIG. 10, a thickness C41 of the first part 41 is greater than or equal to a thickness C42 of the second part 42. Such configuration is beneficial to enhance the light intensity of light emitted from a corner of the light guide plate unit 10, and can improve the problem of dark areas at the boundary between different light guide plate units 10.

In some embodiments, the width W2 of the second part 42 is greater than or equal to 0.7 mm, and/or, the thickness C42 of the second part 42 is greater than or equal to 0.7 mm. Such configuration makes the preparation of the reflective part 11 be compatible with the available process capability to avoid increasing the process difficulty, and also avoids undesirable defects such as pits in the reflective part 11 during the injection molding process.

Exemplarily, as shown in FIG. 2, FIG. 3, FIG. 4, FIG. 6, FIG. 7, and FIG. 8, the transmissive part 12 and the reflective part 11 are in contact with each other. When preparing the light guide assembly 1, the transmissive part 12 can be shaped first by molding, and then the injection molding material for forming the reflective part is injected into the mold including the transmissive part 12 to make the molded reflective part 11 and transmissive part 12 contact each other to increase the structural stability of the light guide assembly 1.

Figure 11:
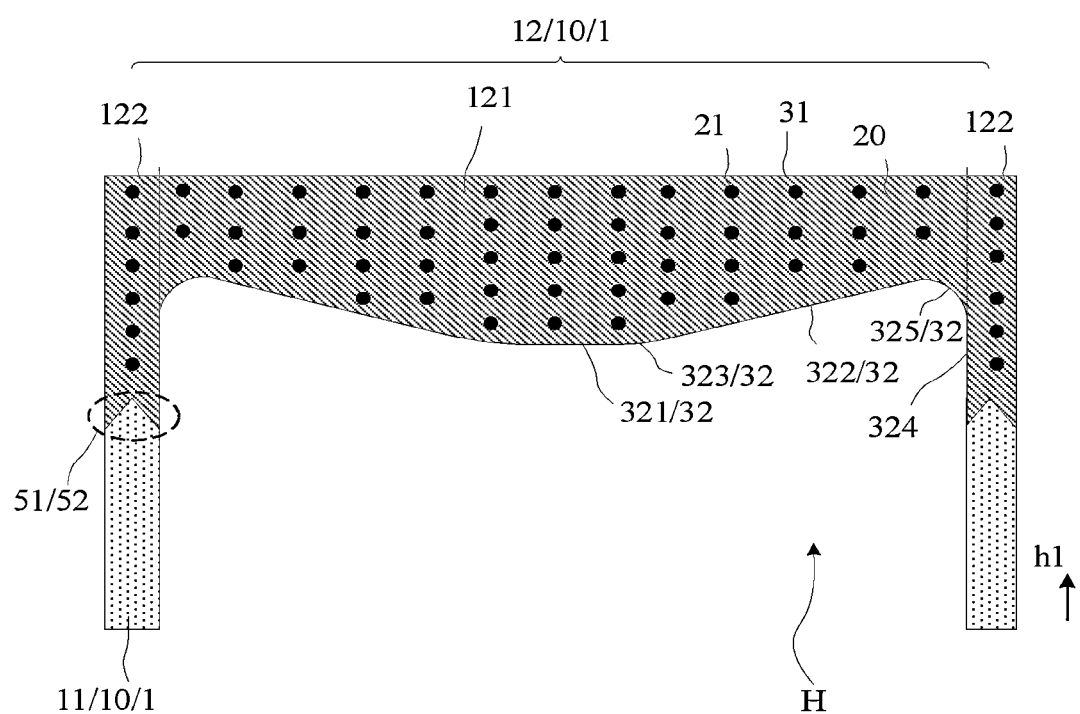
FIG. 11 is another cross-sectional view of a light guide plate assembly provided by some embodiments of the present disclosure.

Exemplarily, a surface of the reflective part 11 adjacent to the transmissive part 12 includes a concave structure and/or a convex structure. That means the reflective part 11 and the transmissive part 12 are connected to each other by a mortise and tenon structure, thereby increasing a contact area between the reflective part 11 and the transmissive part 12 and improving the structural stability of the light guide plate assembly 1. FIG. 11 is another cross-sectional view of a light guide plate assembly provided by some embodiments of the present disclosure. As shown in FIG. 11, the surface of the reflective part 11 adjacent to the transmissive part 12 includes a convex structure 51, and a surface of the transmissive part 12 adjacent to the reflective part 11 includes a concave structure 52. In some embodiments, a cross-sectional shape of the surface of the reflective part 11 adjacent to the transmissive part 12 includes an arc-shaped saw or a triangular saw as shown in FIG. 11.

In some embodiments, the transmissive part 12 and the reflective part 11 are formed in one piece to improve the structural stability of the light guide plate assembly 1.

Embodiments of the present disclosure also provide a backlight module. In combination with FIG. 3, the backlight module 100 includes a light-emitting element 30 and the light guide plate assembly 1 located at the light-exiting side of the light-emitting element 30. That is, the light-emitting element 30 is located at the light-entering side 101 of the light guide plate assembly 1. Along the thickness direction hl of the backlight module 100, the light-emitting element 30 corresponds to the center of the opening H. Exemplarily, the light-emitting element 30 includes a micro light-emitting element (Micro LED and/or Mini LED).

During the operation of the backlight module 100, the light-emitting element 30 emits light. The light emitted from the light-emitting element 30 is guided by the light guide panel assembly 1 to the display panel (not shown) located at the light-exiting side of the light guide panel assembly 1 to cause the display device to display images.

In the backlight module 100 provided by the embodiments of the present disclosure, the light guide plate assembly 1 includes the transmissive part 12 and the reflective part 11 having the opening H, and the light-emitting element 30 is provided in the opening H. Accordingly, a bottom-lighting type backlight module is formed, which facilitates reducing the thickness of the backlight module.

With such configuration, the surface of the reflective part 11 adjacent to the opening H can be used to reflect light emitted from the light-emitting element 30 with a large angle, which can avoid interference between light emitted from different light-emitting elements 30.

In the embodiments of the present disclosure, the transmissive part 12 includes a first part 121, and along the direction from the center of the opening H to the edge of the opening H, the light intensity of the exiting light received by the first part 121 is negatively correlated to the light transmittance of the first part. The light emitted from the light-emitting element 30 and then passing through different positions of the first part 121 can have a uniform light intensity. In this way, uneven light intensity of the light exiting the light guide plate assembly 1 caused by uneven light intensity of the light emitted by the light-emitting element 30 with different emitting angles can be avoided, for example, a visible grid pattern of the backlight module including the light guide plate assembly 1 is avoided, which improves the optical uniform of the backlight module including the light guide plate assembly 1.

Exemplarily, as shown in FIG. 3, at least a portion of the light-emitting element 30 is located in the opening H. That means the light-emitting element 30 is embedded into the light-guide plate assembly 1, which is conducive to reducing the thickness of the backlight module 100.

In some embodiments, as shown in FIG. 3, the distance between the light-emitting element 30 and the transmissive part 12 is greater than 0. Such configuration can avoid collision between the light-emitting element 30 and the light guide plate assembly 1 during assembly.

Exemplarily, as shown in FIG. 4 and FIG. 7, the transmissive part 12 includes a second surface 32, and the second surface 32 includes a first sub-surface 321 corresponding to the center of the opening H along the thickness direction of the light guide plate assembly 1. Along the direction parallel to the plane of the light guide plate assembly 1, an orthographic projection of the first sub-surface 321 on a plane of the backlight module overlaps with an orthographic projection of the light-emitting element 30 on the plane of the backlight module. In this way, more small-angle light emitted from the light-emitting element 30 can pass through a portion of the first part 121 with a smaller light transmittance, i.e., the portion of the first part 121 above the first sub-surface 321, which is conducive to improving the uniformity of the light emitted from the backlight module.

Figure 12:
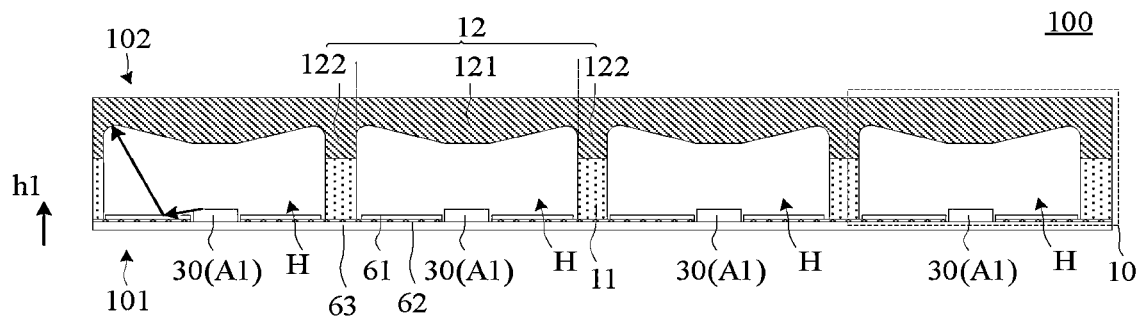
FIG. 12 is another cross-sectional view of another backlight module provided by some embodiments of the present disclosure.

FIG. 12 is another cross-sectional view of another backlight module provided by some embodiments of the present disclosure. Exemplarily, as shown in FIG. 12, the backlight module 100 includes a reflector 61 located in the opening H, and a distance between the reflector 61 and the transmissive part 12 is greater than 0. The reflector 61 and the light-emitting element 30 are staggered from each other along the thickness direction hl of the backlight module. A thickness of the reflector 61 is smaller than the thickness of the reflective part. The reflector 61 can reflect the light emitted by the light-emitting element 30 in a direction away from the light-entering side 101, and the reflected light travels towards the light-exiting side 102 of the backlight module 100. In this way, the light intensity utilization is increased, and the light intensity of light exiting from the light-exiting side of the backlight module 100 is improved, which is conducive to reducing the power consumption of the backlight module 100.

Exemplarily, as shown in FIG. 12, the backlight module includes an adhesion part 62 and a light plate 63, the light plate 63 includes the light-emitting element 30, and exemplarily, the adhesion part 62 includes double-sided adhesive.

Exemplarily, the orthographic projection of the reflector 61 and the orthographic projection of the reflective part 11 are staggered from each other. When preparing the reflector 61, the whole reflective film can be punched and cut into sheet-shaped reflectors using punching or other processes. The adhesion part 62 may be a whole surface structure to bond the reflective part 11 and the light plate 63, and to bond the reflector 61 and the light plate 63. Such configuration can reduce the assembly processes for each component in the backlight module 100 and help to improve the assembly efficiency of the backlight module 100.

Figure 13:
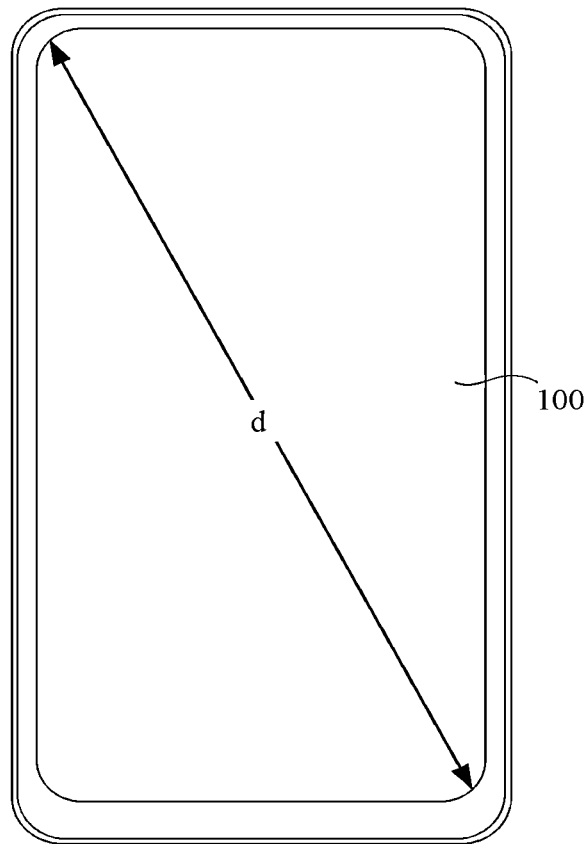
FIG. 13 is a schematic diagram of a display device provided by some embodiments of the present disclosure.

Embodiments of the present disclosure also provide a display device. FIG. 13 is a schematic diagram of a display device provided by some embodiments of the present disclosure. As shown in FIG. 13, the display device includes the backlight module 100. The specific structure of the display panel 100 has been described in detail in the above embodiments and will not be repeated herein. The display device shown in FIG. 13 is only a schematic illustration, and the display device can be, for example, a cell phone, a tablet computer, a laptop computer, an electric paper book, an on-vehicle display screen, a television, or any other electronic device with a display function.

Exemplarily, as shown in FIG. 13, the sizes d of display device are greater than or equal to 20 inches. Exemplarily, the display device includes an on-vehicle display screen. As the tonnage and precision capabilities of the production equipment increase, the size of the display device can be larger.

The above are merely some embodiments of the present disclosure, which, as mentioned above, are not intended to limit the present disclosure. Within the principles of the present disclosure, any modification, equivalent substitution, improvement shall fall into the protection scope of the present disclosure.

What is claimed is:

1. A light guide plate assembly configured to guide exiting light emitted from a light-emitting element, the light guide plate assembly comprising:
a reflective part comprising an opening; and
a transmissive part, wherein at least a part of the transmissive part is located at a side of the reflective part adjacent to a light-exiting side of the light guide plate assembly, and the transmissive part comprises a first part and a second part, wherein, along a direction from a center of the opening to an edge of the opening, light intensity of the exiting light received by the first part is negatively correlated to light transmittance of the first part,
wherein the reflective part is directly beneath the second part.

2. The light guide plate assembly according to claim 1, wherein, along the direction from the center of the opening to the edge of the opening, the light intensity of the exiting light received by the first part decreases, and the light transmittance of the first part increases.

3. The light guide plate assembly according to claim 2, wherein the transmissive part comprises a body and diffusion particles dispersed in the body, wherein at least some of the diffusion particles are above the center of the opening along a thickness direction of the light guide plate assembly.

4. The light guide plate assembly according to claim 3, wherein the diffusion particles are evenly distributed in the body, and the body has a thickness decreasing along the direction from the center of the opening to the edge of the opening.

5. The light guide plate assembly according to claim 4, wherein the light transmittance Y of the first part and the thickness X of the body satisfy:

$$Y=-0.0143X^3+0.1157X^2-0.377X+0.9157.$$

6. The light guide plate assembly according to claim 4, wherein a light diffusion degree D of the first part of the body satisfies: $D \geq 50$, and a melting index M of the body satisfies: $M \geq 30 \text{ cm}^3/10 \text{ min}$.

7. The light guide plate assembly according to claim 1, wherein the first part has a thickness decreasing along the direction from the center of the opening to the edge of the opening.

8. The light guide plate assembly according to claim 7, wherein the transmissive part comprises a first surface located at a side of the transmissive part adjacent to the light-exiting side of the light guide plate assembly, and wherein the first surface is parallel to a plane of the light guide plate assembly.

9. The light guide plate assembly according to claim 8, wherein the transmissive part further comprises a second surface located at a side of the transmissive part adjacent to a light-entering side of the light guide plate assembly, and wherein the second surface comprises a first sub-surface corresponding to the center of the opening along a thickness direction of the light guide plate assembly and parallel to the plane of the light guide plate assembly.

10. The light guide plate assembly according to claim 9, wherein the second surface further comprises a second sub-surface and a third sub-surface, wherein the second sub-surface and the center of the opening are staggered from each other along a thickness direction of the light guide plate assembly, and the third sub-surface connects the first sub-surface and the second sub-surface and comprises a curved surface.

11. The light guide plate assembly according to claim 1, wherein the second part is located at the side of the reflective part adjacent to the light-exiting side of the light-exiting side of the light guide plate assembly at least partially surrounds the first part, wherein the second part and the opening are staggered from each other along a direction perpendicular to a plane of the light guide plate assembly, and wherein a thickness of the second part along the direction perpendicular to the plane of the light guide plate assembly is greater than a minimum thickness of the first part along the direction perpendicular to the plane of the light guide plate assembly.

12. The light guide plate assembly according to claim 1, wherein the second part comprises a fourth sub-surface adjacent to the opening, and the transmissive part comprises a second surface located at a side of the transmissive part adjacent to a light-entering side of the light guide plate assembly, wherein the second surface comprises a second sub-surface and a fifth sub-surface, wherein a center of the second sub-surface and the center of the opening are staggered along a thickness direction of the light guide plate assembly, and the fifth sub-surface connects the second sub-surface and the fourth sub-surface and comprises a curved surface.

13. The light guide plate assembly according to claim 1, wherein the reflective part has a same width along a direction from a light-entering side of the light guide plate assembly to the light-exiting side of the light guide plate assembly, or has a width increasing along the direction from the light-entering side of the light guide plate assembly to the light-exiting side of the light guide plate assembly, wherein a width direction of the reflective part is parallel to a plane of the light guide plate assembly.

14. The light guide plate assembly according to claim 1, wherein a thickness A of the light guide plate assembly and a thickness C of the reflective part satisfy: 0.7 mm≤C≤2A/3.

15. The light guide plate assembly according to claim 1, wherein the reflective part comprises a plurality of reflective parts comprising: a first reflective part, a second reflective part, and a third reflective part that are arranged in a plane of the light guide plate assembly and along a direction from an edge of the light guide plate assembly to a center of the light guide plate assembly, wherein the first reflective part has a thickness greater than or equal to a thickness of the third reflective part, and the thickness of the third reflective part is greater than or equal to a thickness of the second reflective part.

16. The light guide plate assembly according to claim 1, wherein the reflective part comprises a first part and a second part that are connected to each other, wherein a distance between the second part and the center of the opening is greater than a distance between the first part and the center of the opening, and
wherein the first part has a width greater than or equal to a width of the second part.

17. The light guide plate assembly according to claim 1, wherein the reflective part comprises a first part and a second part that are connected to each other, wherein a distance between the second part and the center of the opening is greater than a distance between the first part and the center of the opening, and
wherein the first part has a thickness greater than or equal to a thickness of the second part.

18. A backlight module, comprising:
a light-emitting element; and
a light guide plate assembly located at a light-exiting side of the light-emitting element and configured to guide light emitted from the light-emitting element, wherein the light guide plate assembly comprises:
a reflective part comprising an opening; and
a transmissive part, wherein at least a part of the transmissive part is located at a side of the reflective part adjacent to a light-exiting side of the light guide plate assembly, and the transmissive part comprises a first part and a second part, wherein along a direction from a center of the opening to an edge of the opening, light intensity of the exiting light received by the first part is negatively correlated to light transmittance of the first part, wherein the second part is located at the side of the reflective part adjacent to the light exiting side of the light guide plate assembly, and at least partially surrounds the first part, the second part and the opening are staggered from each other along a direction perpendicular to a plane of the light guide plate assembly, and a thickness of the second part along the direction perpendicular to the plane of the light guide plate assembly is grater than a minimum thickness of the first part along the direction perpendicular to the plane of the light guide plate assembly, wherein the reflective part is directly beneath the second part, and wherein the light-emitting element corresponds to the center of the opening.

19. The backlight module according to claim 18, wherein the transmissive part comprises a second surface located at a side of the transmissive part adjacent to a light-entering side of the light guide plate assembly, wherein the second surface comprises a first sub-surface corresponding to the center of the opening along a thickness direction of the light guide plate assembly, and an orthographic projection of the first sub-surface on a plane of the backlight module covers an orthographic projection of the light-emitting element on the plane of the backlight module.

20. A display device, comprising a display panel and a backlight module, wherein the backlight module comprises:
a light-emitting element; and
a light guide plate assembly located at a light-exiting side of the light-emitting element and configured to guide light emitted from the light-emitting element, wherein the light guide plate assembly comprises:
a reflective part comprising an opening; and a transmissive part, wherein at least a part of the transmissive part is located at a side of the reflective part adjacent to a light-exiting side of the light guide plate assembly, and the transmissive part comprises a first part and a second part, wherein along a direction from a center of the opening to an edge of the opening, light intensity of the exiting light received by the first part is negatively correlated to light transmittance of the first part,
wherein the reflective part is directly beneath the second part, and
wherein the light-emitting element corresponds to the center of the opening.

* * * * *